Patented June 4, 1935

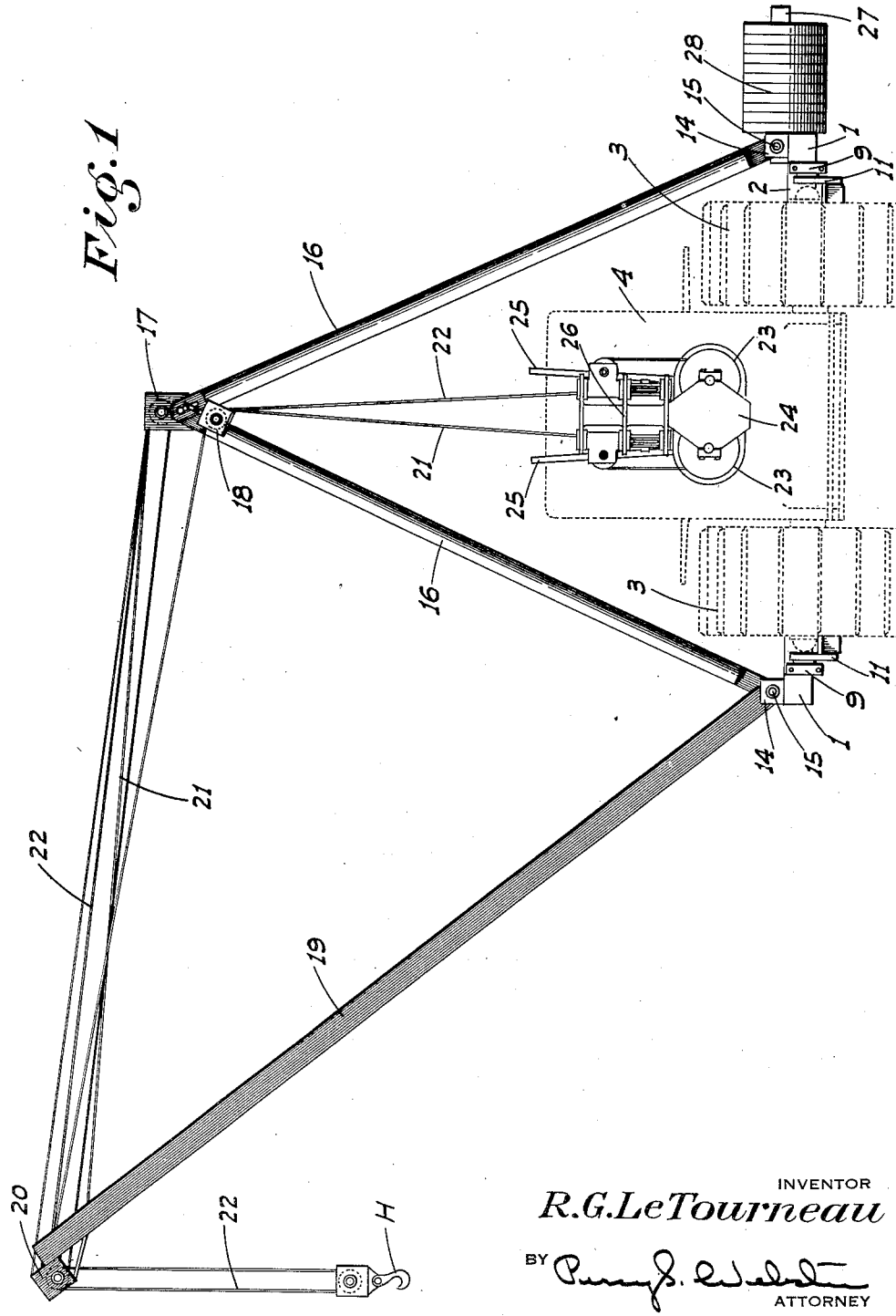

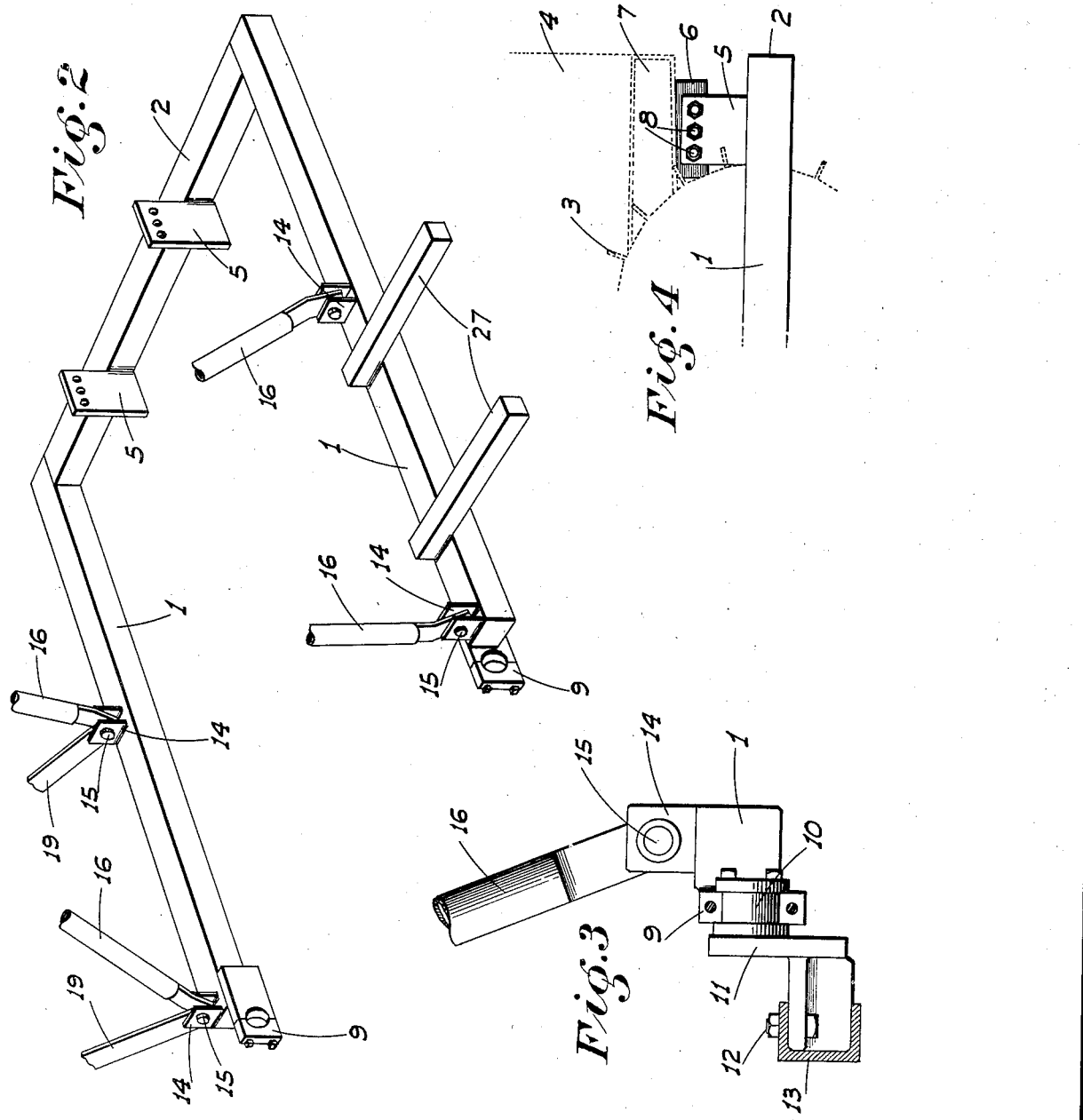

2,003,599

UNITED STATES PATENT OFFICE 2,003,599

TRACTOR DERRICK

Robert G. Le Tourneau, Stockton, Calif.

Application June 10, 1933, Serial No. 675,256

8 Claims. (Cl. 212—8)

This invention relates to traveling cranes or derricks, my principal object being to provide a device of this character which is in the form of an attachment to be removably or permanently mounted on a tractor of any standard make and of large size, and preferably of that type which is mounted on endless tracks as distinguished from wheels. The derrick structure is easily handled and may be operated at relatively high speeds. My derrick may do all that a light locomotive crane can do and at a lesser cost and not being confined to a track, has a wider range of utility. It is thus especially adapted for use by road contractors or public utility companies to assist in laying heavy pipe, setting pole lines, placing culverts, laying rails and similar operations in the field. Since every such contractor owns at least one tractor the additional expense necessary to convert the same into a crane as well as a tractor is obviously much less than the cost of a locomotive or similar crane complete.

At the same time the boom of the derrick may be easily and quickly removed and the tractor may then be operated for ordinary purposes without the remainder of the derrick apparatus interfering with such operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side view of the derrick as mounted on a tractor.

Fig. 2 is a perspective view of the frame of the derrick detached with the boom and mast legs broken off.

Fig. 3 is an enlarged fragmentary end view of the derrick frame on one side showing the means to connect said end to the tractor.

Fig. 4 is a fragmentary side view of the derrick frame at its front end showing the means to connect the same to the tractor frame.

Referring now more particularly to the characters of reference on the drawings, the derrick frame comprises rigid side beams 1 of the hollow rectangular welded form which I use for strength and relative lightness, said beams being rigidly connected at their forward end by a similar cross beam 2. The spacing of the beams 1 is such that they lie outside the endless tracks 3 of the tractor 4 to which the derrick is applied and their length is such that they extend from adjacent the axle of the rear sprocket wheel of the endless tracks to the front end of the tractor beyond said tracks, as shown in Fig. 4. The beam 2 is provided intermediate its ends with rigid upstanding plates 5 which engage brackets 6 secured to and depending from the main engine supporting frame 7 of the tractor (which frame is inwardly of the tracks); the plates 5 being rigidly but removably secured to said brackets by bolts 8.

The beams 1 at their rear end are provided with split bearing yokes 9 which engage trunnions 10. These trunnions project laterally from brackets 11 secured by bolts 12 to the track supporting frames 13 of the tractor in axial alinement with the rear sprockets of the track.

Pairs of ears 14 are secured on and upstanding from the beams 1 at their rear ends and at points intermediate their ends. These ears support pins 15 which form the mounting means for the lower ends of the derrick mast legs 16 of which there are four. These legs converge symmetrically toward their upper ends and are there connected to and support a rigid sheave block 17, another swivelly mounted block 18 being supported from the upper end of one of the legs on the rear side of the block 17 as shown in Fig. 1.

The boom of the derrick is of truss form in a plane longitudinally of the tractor and comprises a pair of arms 19 converging toward their outer ends and at such ends being rigidly connected to and supporting a sheave block 20. The lower ends of the boom arms engage and are turnable on the pins 15 of the ears 14 on the corresponding side of the derrick frame, as shown in Fig. 2. The spacing of the pairs of ears 14 is sufficient to allow the lower ends of the legs as well as the boom arms to project therebetween.

The boom lifting or suspension cables 21 and the hoisting cables 22 from which the sheave of the load supporting hook H is suspended extend back and forth between the sheaves of the various blocks in the usual manner and then over the block 18 and down to separate winding drums 23 mounted on the back of the tractor. The drums are part of a power unit 24 driven from the tractor and of that type shown in my Patent No. 1,912,645, dated June 6, 1933. The operation of the drums is controlled by separate levers 25 projecting above the back of the tractor for selective and convenient manipulation by the operator of the tractor. A cable spooling device 26 of the type shown in my co-pending application for patent, Serial No. 625,052, filed July 27, 1932, is mounted on and above the power unit, the cables from the sheave 18 engaging and being properly directed onto the drums by said device.

Bars 27 to support removable counterweights are secured to and project outwardly from the beam 1 on the side of the frame opposite the boom.

From the above description it will be seen that while the boom may be raised and lowered in the usual manner it cannot of itself swing from one side to the other in a horizontal plane. Since the tractor itself can thus easily swing however and in a very small radius as is customary in modern endless track tractors, the derrick may be manipulated in this respect as conveniently as with a swinging boom derrick. It also has the advantage that the boom always occupies the same position relative to the counterweights and other supporting structure and the necessity for a turntable for the support of the boom is avoided.

If desired the boom may be easily removed by withdrawing the two pins 15 which hold the two legs 19, the cables being of course unstrung at the same time. Also if desired the boom may be mounted on the opposite side of the frame, since the corresponding pins are removable. This may be done in the event that it is to be used for handling light parts when the use of the counterweights is not required. When the boom is thus removed the tractor may be operated for ordinary purposes without dismantling the mast or derrick frame. The mast itself however may be removed by merely withdrawing all the pins 15 and in turn the supporting frame of the derrick may be removed by withdrawing the bolts 8 and disengaging the yokes 9 from the trunnions.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a tractor, a derrick mast upstanding from the tractor, a boom projecting laterally from the tractor on one side thereof, a frame extending along the sides of the tractor and across one end of the same, means connecting the frame to the tractor, the mast including a pair of legs diverging from their upper ends to terminations above one of the side members of the frame, and a common means to connect said legs to the frame and to also swively connect the lower end of the boom to the frame.

2. A derrick for attachment to an endless track tractor comprising a frame having side beams to extend outwardly of the tracks to one end of the tractor and a cross beam connecting the side beams at said ends, means to connect said cross beam to the main frame of the tractor, means to connect the side beams at their opposite ends to the track frames, ears upstanding from the side beams at spaced points in their length, legs upstanding from said ears and converging to their upper ends to form a mast, means tying the upper ends of said legs together, a boom comprising arms spaced lengthwise of the frame, the lower ends of the arms extending to adjacent the ears on one side beam and the adjacent mast legs, and pins through the ears, legs and arms.

3. A structure as in claim 2, in which said pins are removable to permit of removal of the boom or the placement of the same on the opposite side of the frame.

4. A structure as in claim 2, in which said leg tying means includes a sheave block disposed between and secured to the legs at their upper ends.

5. A derrick structure for attachment to a tractor comprising a unitary frame to extend about the tractor, means to secure the frame to the tractor, a mast comprising legs mounted on the side members of the frame and extending upwardly in converging relation to each other, a boom projecting laterally from the frame, and means to connect the legs to the frame, said means on one side also serving to swively connect the lower end of the boom to the frame and comprising removable pins.

6. A derrick structure for attachment to an endless track tractor comprising a mast, a boom and a frame on which said mast and boom are mounted, said frame comprising side beams to extend outwardly of and along the tracks to the front end of the tractor and a cross beam connecting the side beams at their forward end, elements on the cross beam for connection with the adjacent portion of the main frame of the tractor, bearing yokes on the side beams at their rear end, trunnions engaging the yokes, and means to mount the trunnions on the endless track frames in axial alinement with the drive sprockets of the endless tracks.

7. A derrick structure for attachment to a tractor comprising a horizontal frame adapted to be secured to the tractor, legs to form a mast projecting upwardly from said frame, said legs at their lower end being spaced lengthwise of the frame, a boom comprising arms which at their lower end are spaced apart substantially the same as the legs at their lower end, and terminating in overlapping relation thereto, ears on the frame adjacent said arm and leg terminations, and pins through the ears, arms and legs.

8. A derrick structure for attachment to a tractor comprising a unitary frame to extend about the tractor, means to secure the frame to the tractor, a mast comprising a pair of legs mounted on each side member of the frame and extending upwardly therefrom, the legs of each pair converging toward each other and toward the opposite pair, a boom mounted on the frame, and means to tie the upper ends of the legs together including a sheave block disposed between and secured to the legs at their upper ends.

ROBERT G. LE TOURNEAU.